Patented May 11, 1926.

1,584,129

UNITED STATES PATENT OFFICE.

ALBERT OBERSOHN, OF BERLIN-CHARLOTTENBURG, WILHELM WACHTEL, OF BERLIN, DANIEL SAKOM, OF WIESBADEN, AND PAUL ASKENASY, OF KARLSRUHE, GERMANY, ASSIGNORS TO AKTIENGESELLSCHAFT FÜR CHEMISCHE PRODUKTE VORMALS H. SCHEIDE MANDEL, OF BERLIN, GERMANY.

PROCESS FOR THE MANUFACTURE OF COLLOIDAL SUBSTANCES IN THE FORM OF SMALL BALLS OR GRAINS.

No Drawing. Original application filed March 13, 1924, Serial No. 699,127. Divided and this application filed January 7, 1925. Serial No. 1,085.

This application which is a divisional application from Serial Number 699,127 filed March 13, 1924 relates to a process for producing colloidal substances in the form of small balls or grains.

When a hot solution of a colloidal substance, such as glue, gelatine or the like, is passed through a cooling bath composed of a liquid which does not mix with the colloid, the resulting drops of the colloid form into small balls or grains which are rapidly solidified by the action of the cooling bath. The grains so produced may then be removed and dried. Glue in this form is very convenient both for use and for shipment and it dries more easily than in slab form and is more readily melted. In the following specification, the terms glue or solutions of glue are to be understood to include all colloidal substances having the properties of glue which it is or may be considered desirable to produce in granular form.

It has been proposed to employ cooling agents which are non-miscible with or solvent of the glue solution. Such agents are usually expensive, and sometimes noxious, and must be removed by a further step in the operation, thus increasing the cost of manufacture.

According to this invention, these disadvantages may be avoided by employing fluids which do not so favorably assist the action of the formation of the grains, as for instance water, aqueous solutions of salts, aqueous emulsions, and the like, provided the colloidal substance is introduced into the fluid in question in the form of drops. Such fluids have the merit that they are cheaper and do not have any deleterious action even if they do adhere to some extent to the grains.

In carrying the invention into effect, a vessel containing such an aqueous fluid, solution or emulsion, cooled to approximately 1° centigrade, may have the glue solution led therethrough in the form of drops. This glue solution may come directly from the glue separating plant at a temperature of about 50° centigrade. The drops sink slowly through the solution, and are chilled faster than solution may occur, so that they deposit at the bottom as solid grains, and may be removed therefrom for drying in any suitable manner.

What we claim is:

1. The process for producing colloidal substances of the class described in granular form consisting in preparing the substance in the form of hot concentrated solution miscible with water, splitting the solution into the form of drops, and passing the drops into a highly cooled aqueous liquid normally solvent of said substance and removing the solidified drops therefrom before any substantial solvent action occurs.

2. The process for preparing glue in the form of pearls consisting in preparing the material in the form of a hot concentrated solution miscible with water, splitting the solution into the form of drops, and passing the drops into water cooled to about one degree C.

3. The process for producing granules from colloids derived from bone and hide substances which consists in preparing the substance in the form of a hot concentrated solution in water, splitting the solution into the form of drops, and passing the drops into a highly cooled aqueous liquid which at normal temperatures is solvent of said substance.

In testimony whereof we have signed our names to this specification.

ALBERT OBERSOHN.
WILHELM WACHTEL.
DANIEL SAKOM.
PAUL ASKENASY.